Jan. 30, 1934.  I. SAKS  1,945,382

CLUTCH OR TRANSMISSION PLATE

Filed Aug. 6, 1931

INVENTOR.
Ira Saks
BY
Fay Oberlin & Fay
ATTORNEYS.

Patented Jan. 30, 1934

1,945,382

UNITED STATES PATENT OFFICE

1,945,382

CLUTCH OR TRANSMISSION PLATE

Ira Saks, Cleveland, Ohio

Application August 6, 1931. Serial No. 555,455

4 Claims. (Cl. 192—107)

The present invention relating as indicated to a clutch or transmission plate, has more particular reference to the type of plate employed in the assembly of "dry plate" clutch construction. The clutch plate or driven plate is a member which is adapted to be inserted between a pressure plate and a fly wheel and to achieve the function of transmission of torque by means of frictional engagement.

It is the general object and nature of the present invention to provide a form of clutch plate which will not have a grabbing or uneven action when placed in engagement with the pressure plate or any other method of contact. It is a further object to provide a form of construction whereby the friction facing rings may be replaced with facility and without subjecting the disc to stresses which might tend to remove their offset deformation.

It is a further object to provide a means for ventilating the friction facing and at the same time to introduce an additional air-cushioning effect into the action of the plate. Further advantages shall become apparent as the description proceeds. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
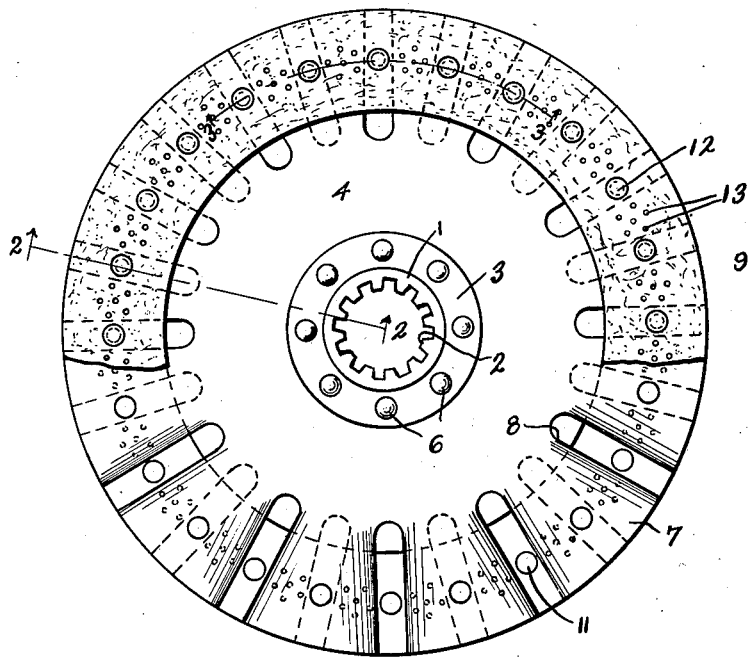
Figure 2:
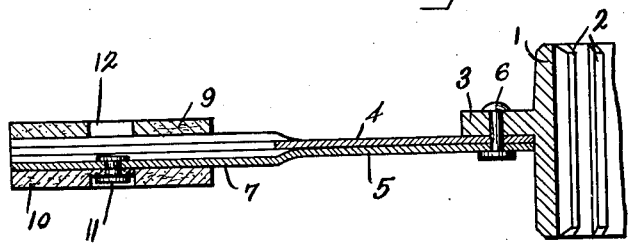
Figure 4:
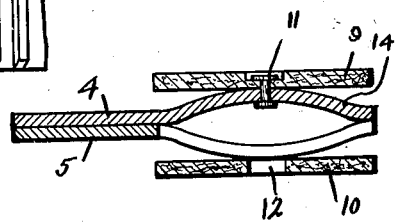
Figure 3:
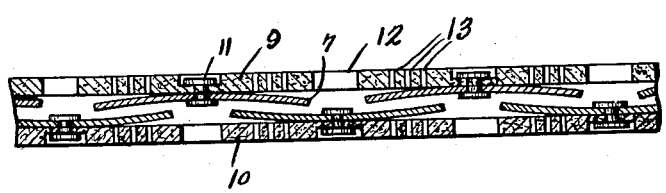

In said annexed drawing:

Fig. 1 is an elevational view with part of the facing ring removed, of the clutch plate embodying the principle of my invention; Fig. 2 is a section taken substantially upon lines 2—2 of Fig. 1; Fig. 3 is a fragmentary section taken substantially upon the arcuate line 3—3 of Fig. 1; Fig. 4 is a fragmentary section illustrative of an alternative form of sector construction.

Referring more particularly to the drawing, my clutch plate consists of the hub 1 having the interior spline 2 for engagement with the driven shaft of a clutch assembly. A flange 3 extending from the central portion of the hub 1 has secured thereto a pair of discs 4 and 5 by means of suitable bolts or rivets or welding 6. The discs 4 and 5 have their outer peripheries in the form of arcuately bowed sectors 7 and the radially extending notches 8. The clutch facing rings 9 and 10 which are composed of suitable fibre or other friction material are secured to the central portions of the sectors 7 by means of the rivets 11. The holes 12 are placed in the friction rings 9 and 10 at points intermediate the rivets 11. Referring more particularly to Fig. 3, it will be seen that the openings or holes 12 register with the rivets in the opposite friction rings. The purpose of such lateral construction is to enable the insertion of riveting tools through the holes 12, and correspondingly through the slots 8 in order to permit access to the oppositely disposed rivets for the purpose of replacing the friction rings. If such access were not possible it can readily be seen that in attempting to exert a riveting pressure generally upon the arcuately curved sectors 7 that there would be a tendency to bend such sectors out of shape, with the result that they would be deprived of some of their cushioning effect which is so vital to the operation of the clutch plate.

In order to produce an additional air-cushioning effect to the action of the plate there are provided the plurality of perforations 13 at points substantially adjacent to the rivet fasteners 11. The perforations 13 perform such an air-cushioning effect by virtue of the fact that they tend to admit air between the friction facings and the metallic sectors. The air which has then been admitted to such points becomes trapped therein when the pressure plate makes contact with the facing rings and effects an initial closure of the exterior openings of the perforations. The perforations 13 serve an additional purpose in that they impart a ventilating effect to the friction rings 9 and 10 and tend to retard the temperature induced in the friction rings as well as the steel discs due to frictional reaction. Since the degree of wear in a friction operating member is directly proportional to its ability to resist heat, it will be seen that the presence of the ventilating perforations 13 serves to impart the quality of additional durability to the friction rings 9 and 10.

In the alternative form of construction illustrated in Fig. 4, I have imparted a radial instead of an arcuate curve to the peripheral sectors. Fig. 4 is a fragmentary radial section, similar to Fig. 2, disclosing the radially bowed or curved sectors indicated generally by the numeral 14. The construction of the facing rings 9 and 10 and the relative positioning of the slots 8 and rivets 11 remains substantially as hereinbefore described.

Due to the fact that the friction rings are mounted upon the bowed sectors 7, there will be a yielding or cushioning action imparted to the clutch plate when it is placed in initial contact with the clutch pressure or contact plate with the result that there occurs a smooth and even engagement of the parts.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A clutch plate comprising the combination of a pair of discs mounted on a hub member, said discs having a plurality of arcuately curved peripheral sectors, and radially extending slots between said sectors, said slots in one disc being positioned opposite the central portion of said sectors in the other disc.

2. A clutch plate comprising the combination of a pair of discs mounted on a hub member, said discs having a plurality of arcuately curved peripheral sectors, radially extending slots between said sectors, and rivets adapted to secure friction facing rings to the central portions of said sectors, said slots in one of said discs being so positioned as to be in registry with said rivets in the other of said discs.

3. A clutch plate comprising the combination of a pair of discs mounted on a hub member, said discs having a plurality of arcuately curved peripheral sectors, radially extending slots between said sectors, and rivets adapted to secure friction facing rings to the central portions of said sectors, said slots in one of said discs being so positioned as to be in registry with said rivets in the other of said discs, and holes in said facing rings in registry with said rivets and said slots.

4. A clutch plate comprising the combination of a pair of discs mounted on a hub member, said discs having a plurality of arcuately curved peripheral sectors, radially extending slots between said sectors, and rivets adapted to secure friction facing rings to the central portions of said sectors, said slots in one of said discs being so positioned as to be in registry with said rivets in the other of said discs, and perforations in said facing rings at points intermediate said rivets.

IRA SAKS.